United States Patent
Kuo

(10) Patent No.: US 12,450,767 B2
(45) Date of Patent: Oct. 21, 2025

(54) SYSTEMS AND METHODS FOR CONTACTLESS ESTIMATION OF RING SIZE

(71) Applicant: Perfect Mobile Corp., New Taipei (TW)

(72) Inventor: Chia-Chen Kuo, Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 318 days.

(21) Appl. No.: 18/170,205

(22) Filed: Feb. 16, 2023

(65) Prior Publication Data

US 2023/0281855 A1    Sep. 7, 2023

Related U.S. Application Data

(60) Provisional application No. 63/316,485, filed on Mar. 4, 2022.

(51) Int. Cl.
G06T 7/62     (2017.01)
G06T 11/00    (2006.01)

(52) U.S. Cl.
CPC ............... G06T 7/62 (2017.01); G06T 11/00 (2013.01); *G06T 2200/24* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,976,829 B1 * | 4/2021 | Viswanathan | G06N 20/00 |
| 11,037,318 B1 | 6/2021 | Kaplan et al. | |
| 11,055,868 B2 | 7/2021 | Shea et al. | |
| 2002/0093515 A1 | 7/2002 | Fay et al. | |
| 2013/0290911 A1 * | 10/2013 | Praphul | G06F 3/038 715/863 |
| 2018/0356894 A1 * | 12/2018 | Aalbu | G06V 40/28 |
| 2019/0005672 A1 | 1/2019 | McLear et al. | |
| 2019/0096078 A1 * | 3/2019 | Bailey | G06T 7/248 |
| 2020/0013182 A1 | 1/2020 | Sompura | |

FOREIGN PATENT DOCUMENTS

| | | |
|---|---|---|
| JP | 5254897 B2 | 8/2013 |
| KR | 10-2154953 B1 | 9/2020 |

OTHER PUBLICATIONS

Extended European Search Report dated May 22, 2023, issued in application No. EP 23160280.6.
Florian Rufer et al. "White-to-white corneal diameter . . . " (https://pubmed.ncbi.nlm.nih.gov/15778595/).

* cited by examiner

*Primary Examiner* — Kyle Zhai
(74) *Attorney, Agent, or Firm* — McClure, Qualey & Rodack, LLP

(57) ABSTRACT

A computing device prompts a user to place the user's hand next to a facial region of the user and obtains an image depicting the facial region and a finger of the user. The computing device measures a diameter of an iris in the facial region and measures a width of finger region located between two knuckles on the finger depicted in the image. The computing device estimates a ring size of the finger based on an actual iris diameter, the measured iris diameter, and/or the measured finger region width. The computing device outputs the estimated ring size.

12 Claims, 9 Drawing Sheets

SYSTEMS AND METHODS FOR CONTACTLESS ESTIMATION OF RING SIZE

CROSS-REFERENCE TO RELATED APPLICATION

This application claims priority to, and the benefit of, U.S. Provisional Patent Application entitled, "Method and system for determining ring size," having Ser. No. 63/316,485, filed on Mar. 4, 2022, which is incorporated by reference in its entirety.

TECHNICAL FIELD

The present disclosure generally relates to systems and methods for contactless estimation of ring size.

SUMMARY

In accordance with one embodiment, a computing device prompts a user to place the user's hand next to a facial region of the user and obtains an image depicting the facial region and a finger of the user. The computing device measures a diameter of an iris in the facial region and measures a width of finger region located between two knuckles on the finger depicted in the image. The computing device estimates a ring size of the finger based on an actual iris diameter, the measured iris diameter, and/or the measured finger region width. The computing device outputs the estimated ring size.

In accordance with another embodiment, a computing device prompts a user to place the user's hand next to a facial region of the user and obtains an image depicting the facial region and a finger of the user. The computing device measures a pupillary distance between eyes depicted in the image. The computing device estimates a ring size of the finger based on an actual pupillary distance and/or the measured pupillary distance. The computing device outputs the estimated ring size.

Another embodiment is a system that comprises a memory storing instructions and a processor coupled to the memory. The processor is configured by the instructions to prompt a user to place the user's hand next to a facial region of the user and obtain an image depicting the facial region and a finger of the user. The processor is further configured to measure a diameter of an iris in the facial region and measure a width of finger region located between two knuckles on the finger depicted in the image. The processor is further configured to estimate a ring size of the finger based on an actual iris diameter, the measured iris diameter, and/or the measured finger region width. The processor is further configured to output the estimated ring size.

Another embodiment is a non-transitory computer-readable storage medium storing instructions to be implemented by a computing device. The computing device comprises a processor, wherein the instructions, when executed by the processor, cause the computing device to prompt a user to place the user's hand next to a facial region of the user and obtain an image depicting the facial region and a finger of the user. The processor is further configured by the instructions to measure a diameter of an iris in the facial region and measure a width of finger region located between two knuckles on the finger depicted in the image. The processor is further configured by the instructions to estimate a ring size of the finger based on an actual iris diameter, the measured iris diameter, and/or the measured finger region width. The processor is further configured by the instructions to output the estimated ring size.

Other systems, methods, features, and advantages of the present disclosure will be apparent to one skilled in the art upon examining the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure are better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
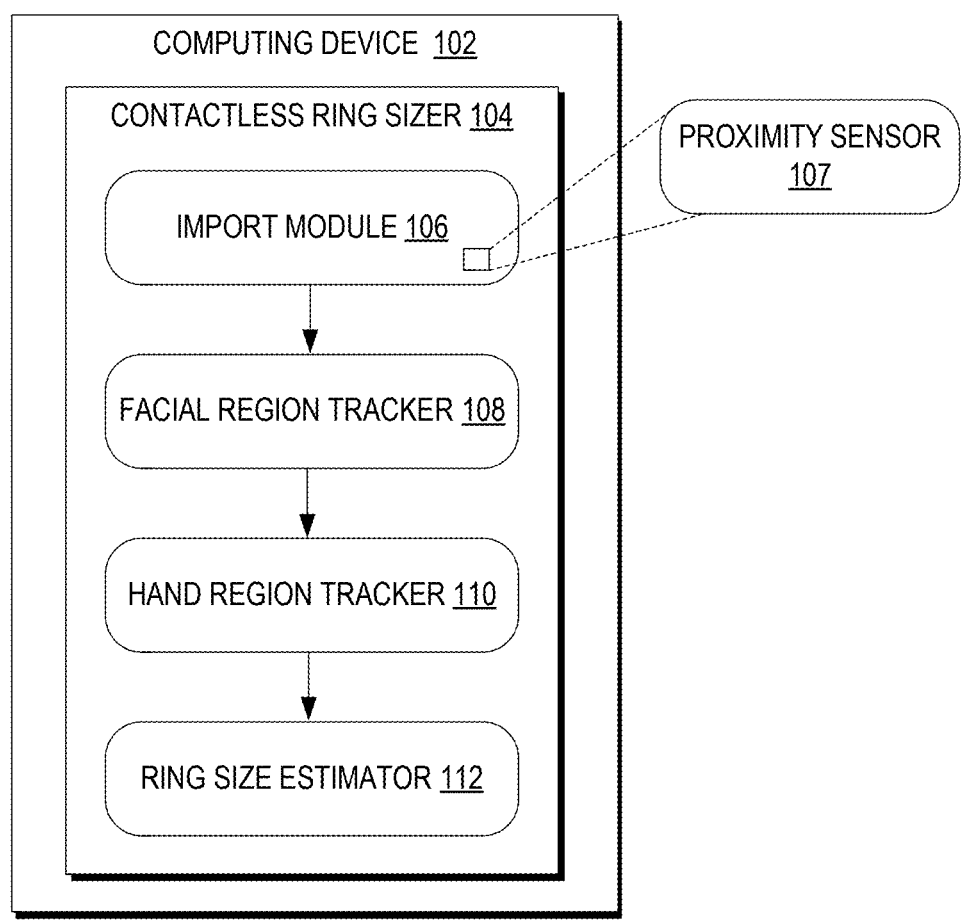
FIG. 1 is a block diagram of a computing device configured to perform contactless ring size estimation according to various embodiments of the present disclosure.

The subject disclosure is now described with reference to the drawings, where like reference numerals are used to refer to like elements throughout the following description. Other aspects, advantages, and novel features of the disclosed subject matter will become apparent from the following detailed description and corresponding drawings.

There is a need for an improved way for allowing consumers to determine a ring size without the use of a ring-sizing tool since a ring-sizing tool or a tape measure is not always readily accessible for measuring the ring size. The present disclosure is directed to systems and methods for allowing users to hold up their hand next to their face, where the system captures an image of depicting the facial region and a finger of the user. The system then measures such parameters as the iris diameter, the pupillary distance, and finger region width, and estimates the user's ring size by using one or more of the measured values in combination with the actual iris diameter value or actual pupillary distance value.

For purposes of this disclosure, a value of 11.7 mm is used for the actual iris diameter because the average white-to-white horizontal diameter of the eye is approximately 11.7 mm±0.5 mm. Exemplary embodiments utilize 11.7 mm as a reference value when estimating the ring size of the user. The pupillary distance is the distance between the centers of the user's pupils. For some embodiments, the system outputs the user's estimated ring size and performs virtual application of a desired ring.

A description of a system for implementing a contactless ring size estimator is now described followed by a discussion of the operation of the components within the system. FIG. 1 is a block diagram of a computing device 102 in which the embodiments disclosed herein may be implemented. The computing device 102 may comprise one or more processors that execute machine executable instructions to perform the features described herein. For example, the computing device 102 may be embodied as a computing device such as, but not limited to, a smartphone, a tablet-computing device, a laptop, and so on.

A contactless ring sizer 104 executes on a processor of the computing device 102 and includes an import module 106, a facial region tracker 108, a hand region tracker 110, and a ring size estimator 112. The import module 106 is configured to obtain digital images of a user holding the user's hand next to the facial region of the user. For some embodiments, the import module 106 guides the user regarding optimal placement of the user's hand relative of the facial region of the user. For example, the import module 106 may be configured to prompt the user to place the user's hand next to the facial region such that a palm of the hand faces towards the user, to facilitate the measurement of a finger region width described below.

A proximity sensor 107 in the import module 106 detects when the user's hand is within a threshold distance of the user's face since placement of the user's hand close to the user's face allows the computing device 102 to perform a more accurate estimation of the user's ring size. For some embodiments, when the proximity sensor 107 determines that the user's hand is within a threshold distance of the user's face, the import module 106 obtains an image depicting the facial region and a finger of the user. For some embodiments, the import module 106 is configured to cause a camera (e.g., front-facing camera) of the computing device 102 to capture an image or a video of a user of the computing device 102. Alternatively, the import module 106 may obtain an image or video of the user from another device or server where the computing device 102 may be equipped with the capability to connect to the Internet.

The images obtained by the import module 106 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. The video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The facial region tracker 108 is configured to track the eyes of the user depicted in the captured image and measure a diameter or radius of an iris in the facial region. For some embodiments, the facial region tracker 108 measures the diameter or radius of the iris of the user's eye closest to the user's hand depicted in the captured image. For some embodiments, the facial region tracker 108 is configured to also measure a pupillary distance between the user's eyes depicted in the image.

The hand region tracker 110 is configured to track a hand of the user depicted in the image and measure the width of a finger region located between two knuckles (e.g., the base knuckle and the middle knuckle) on the finger depicted in the image. The ring size estimator 112 is configured to estimate a ring size of the finger based on an actual iris diameter, an actual pupillary distance, the measured iris diameter, the measured finger region width, and/or the measured pupillary distance. For some embodiments, the ring size estimator 112 then outputs the estimated ring size and performs virtual application of a selected ring on the user's finger, thereby allowing the user to evaluate the appearance of the ring.

Figure 2:
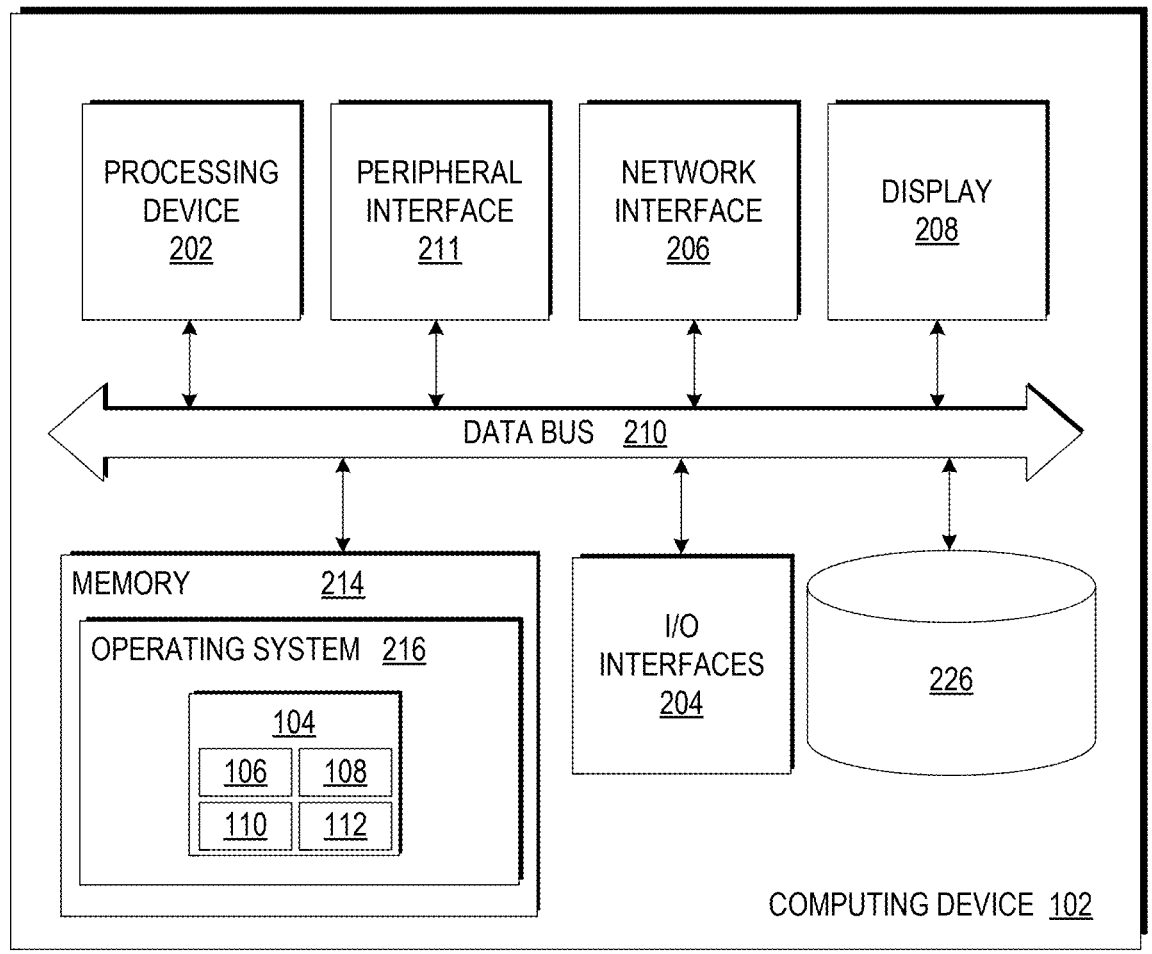
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software that may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
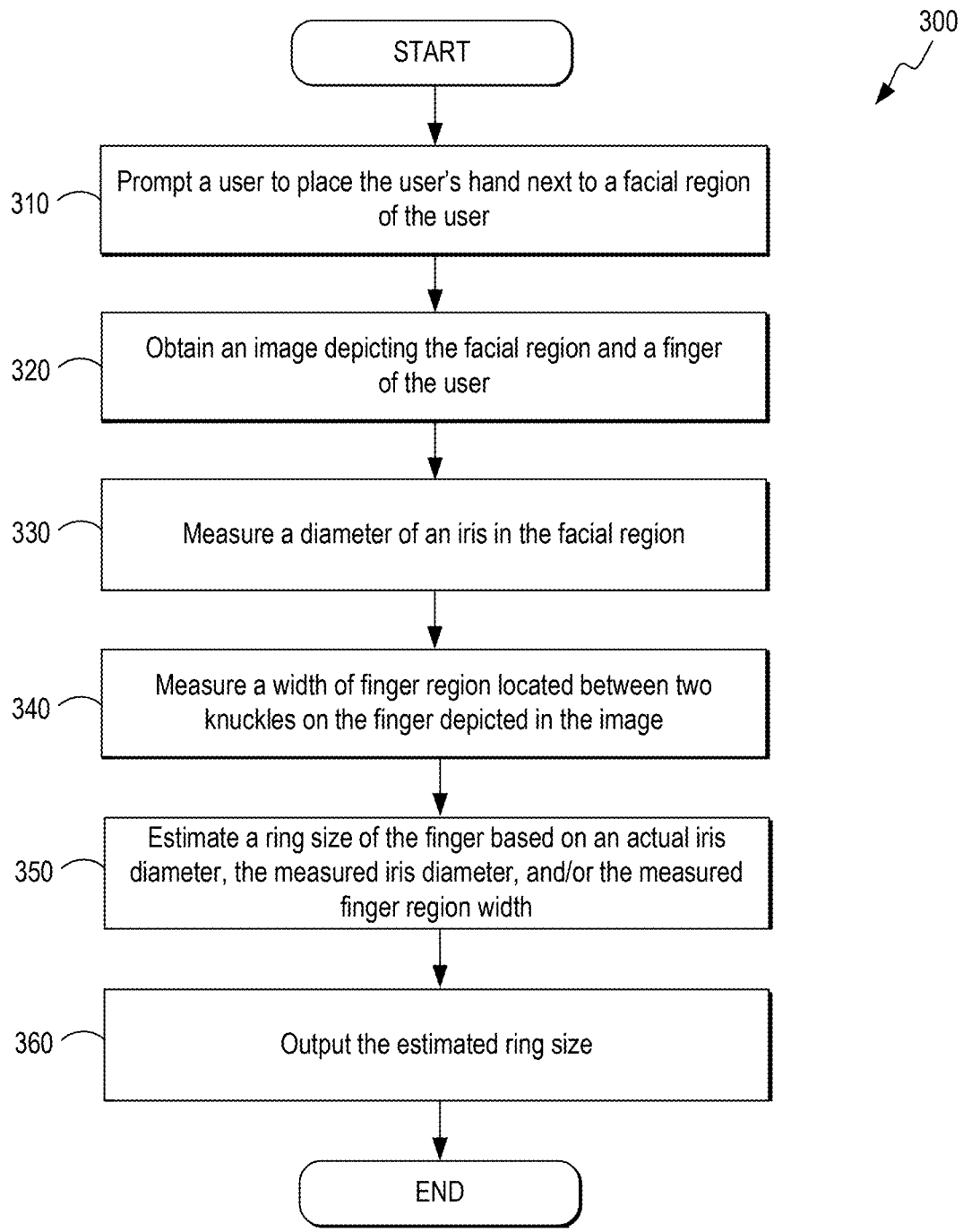
FIG. 3 is a top-level flowchart illustrating examples of functionality implemented as portions of the computing device of FIG. 1 for performing contactless ring size estimation according to various embodiments of the present disclosure.

Reference is made to FIG. 3, which is a flowchart 300 in accordance with various embodiments for performing contactless ring size estimation, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

At block 310, the computing device 102 prompts a user regarding placement of the user's hand for purposes of estimating the user's ring size. For some embodiments, the computing device 102 prompts the user to place the user's hand next to a facial region of the user. For some embodiments, the computing device 102 guides the user regarding placement of the hand such that a palm of the hand faces towards the user and the top of the hand is facing a front-facing camera of the computing device 102.

At block 320, the computing device 102 obtains an image depicting the facial region and a finger of the user. For some embodiments, the image is obtained by the computing device 102 when a trigger event is detected. In particular, the computing device 102 may be configured to obtain an image depicting the facial region and a finger of the user when the user's hand is within a threshold distance of the facial region of the user.

At block 330, the computing device 102 measures a diameter or a radius of an iris in the facial region. At block 340, the computing device 102 measures a width of the finger region located between two knuckles (e.g., the base knuckle and the middle knuckle) on the finger depicted in the image. For some embodiments, the width of the finger region is measured approximately halfway between the two knuckles on the finger depicted in the image. For some embodiments, the computing device 102 measures the width of the finger region located between the two knuckles on the finger by determining an orientation of the user's hand depicted in the image and detecting the locations of edges of the finger region located between the two knuckles based on the orientation of the user's hand. The computing device 102 then measures a distance between the edges as the width of the finger region. The iris diameter, the finger region width, and the estimated pupillary distance are generally measured in number of pixels.

At block 350, the computing device 102 estimates a ring size of the finger based on an actual iris diameter, the measured iris diameter, and/or the measured finger region width. At block 360, the computing device 102 outputs the estimated ring size. For some embodiments, the computing device 102 may be further configured to perform virtual application of a ring on the finger based on the estimated ring size.

For some embodiments, the computing device 102 estimates the ring size based on the actual iris diameter, the measured iris diameter, and/or the measured finger region width, where the ring size is estimated according to the following equation:

$$\text{estimated ring size} = \text{actual iris diameter} \times \frac{\text{measured finger region width}}{\text{measured iris diameter}},$$

where the actual iris diameter is 11.7 mm and the estimated ring size is measured in millimeters. A value of 11.7 mm is used for the actual iris diameter because the average white-to-white horizontal diameter of the eye is approximately 11.7 mm±0.5 mm. The computing device 102 utilizes the 11.7 mm as a reference value when estimating the ring size of the user.

In some instances, the user may know the actual pupillary distance of the user based on, for example, a glasses prescription. The actual pupillary distance is the distance between the centers of the user's pupils. In some instances, the pupillary distance may be included in glasses prescriptions as this measurement is used to determine where the user looks through the lens of the user's glasses. For some embodiments, the user can enter the actual pupillary distance based on an actual measurement of the optical center, and the computing device 102 estimates the ring size based on the actual pupillary distance, the measured iris diameter, and the measured pupillary distance, where the ring size is estimated according to the following equation:

$$\text{estimated ring size} = \text{actual pupillary distance} \times \frac{\text{measured iris diameter}}{\text{measured pupillary distance}},$$

where the estimated ring size is measured in millimeters. Thereafter, the process in FIG. 3 ends.

Figure 4:
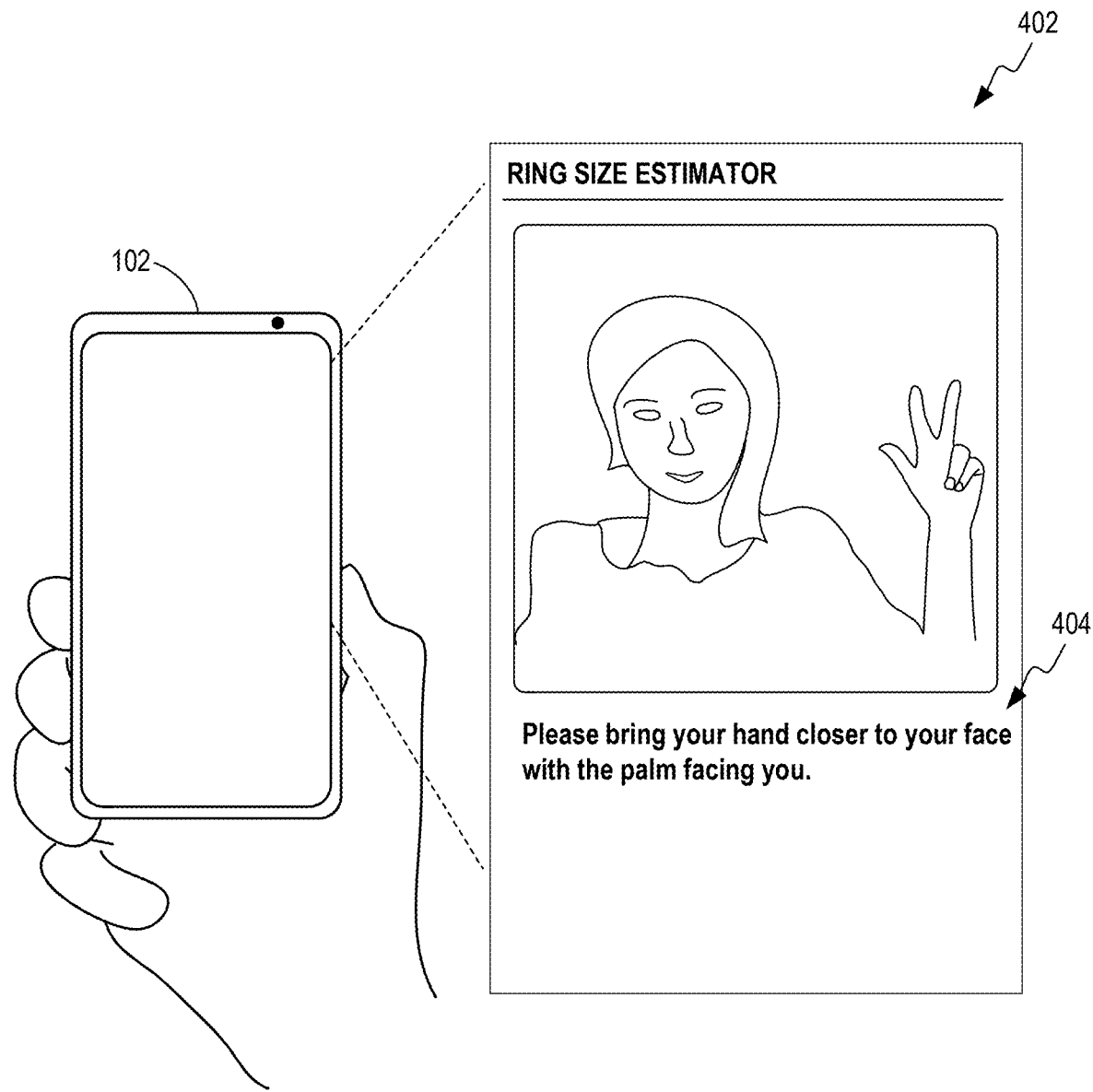
FIG. 4 illustrates an example user interface generated by the computing device of FIG. 1 according to various embodiments of the present disclosure.

To illustrate further various aspects of the present invention, reference is made to the following figures. FIG. 4 illustrates an example user interface 402 provided on a display of the computing device 102 (FIG. 1) whereby an image of the user is displayed. As described above, the import module 106 (FIG. 1) executing in the computing device 102 can be configured to cause a camera (e.g., front-facing camera) of the computing device 102 to capture an image or a video of a user of the computing device 102. In the example user interface 402, the image depicts the user holding up the user's hand. As described above, the computing device 102 may be configured to guide the user regarding optimal placement of the user's hand for purposes of estimating the ring size of the user. In the user interface 402, a prompt 404 is displayed to the user instructing the user on where to place the user's hand relative to the facial region of the user.

Figure 5:
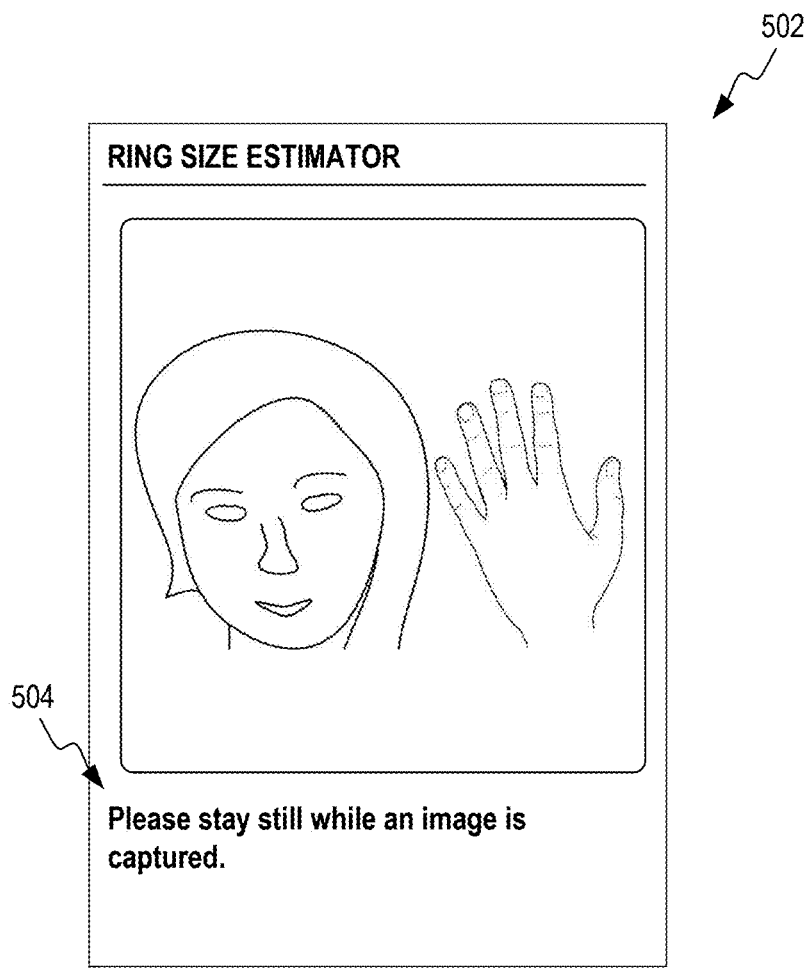
FIG. 5 illustrates an example user interface for guiding the user regarding hand placement according to various embodiments of the present disclosure.

FIG. 5 illustrates an example user interface 502 provided on a display of the computing device 102 (FIG. 1) for guiding the user regarding hand placement according to various embodiments of the present disclosure. When the proximity sensor 107 (FIG. 1) executing in the computing device 102 senses that the user's hand is within a threshold distance of the user's facial region, the user interface 502 displays a prompt 504 instructing the user to remain still while the import module 106 (FIG. 1) causes a front-facing camera of the computing device 102 to capture an image of the user. The facial region tracker 108 (FIG. 1) is configured to analyze the facial region depicted in the captured image, while the hand region tracker 110 (FIG. 1) is configured to analyze the hand region depicted in the captured image in order to estimate the ring size of the user.

Figure 6:
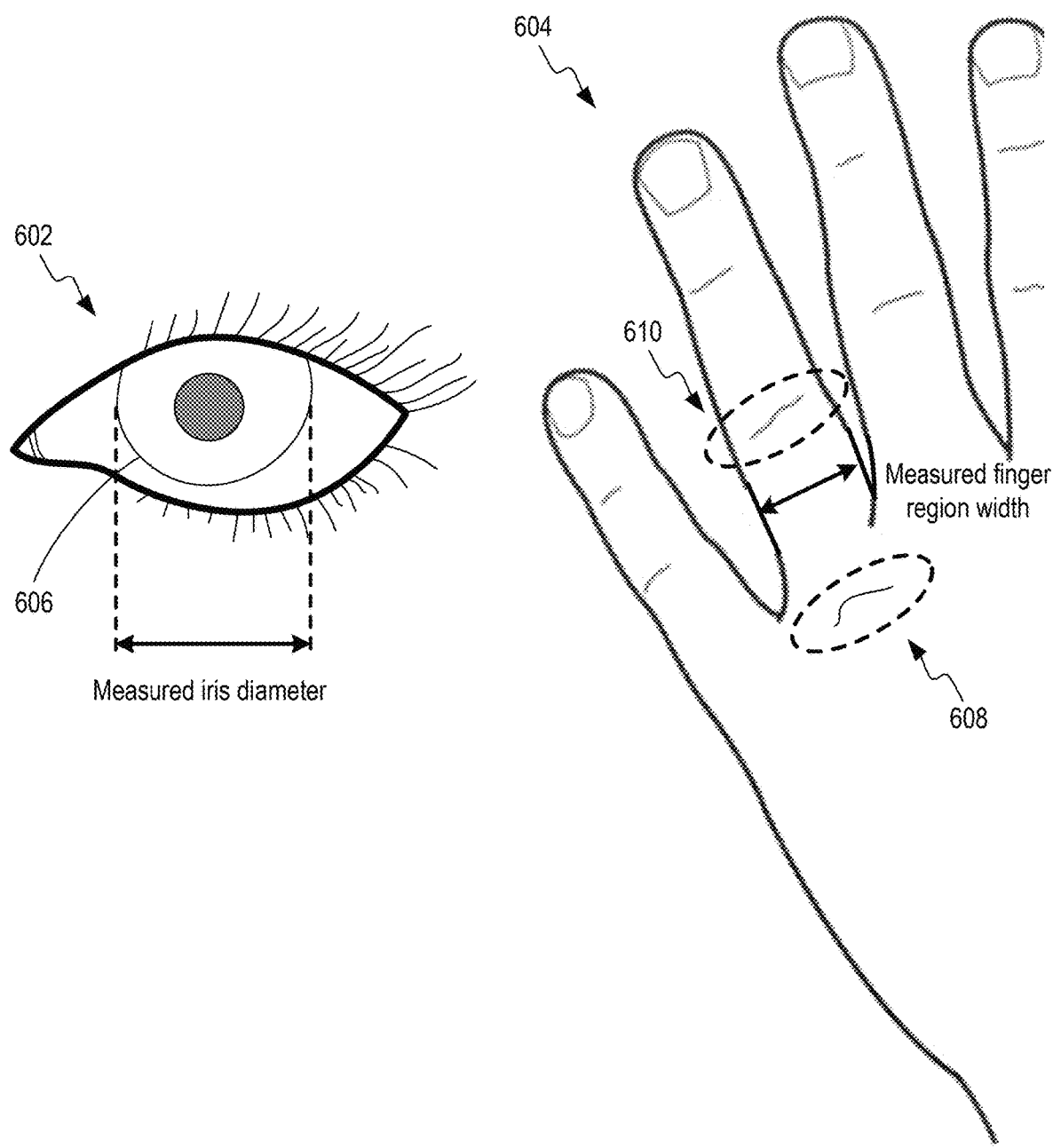
FIG. 6 illustrates the computing device of FIG. 1 estimating the ring size of the user based on the measured iris diameter and the measured finger region width of the user according to various embodiments of the present disclosure.

FIG. 6 illustrates the computing device 102 of FIG. 1 estimating the ring size of the user based on the measured iris diameter and the measured finger region width of the user. The facial region tracker 108 (FIG. 1) identifies an eye 602 of the user closest to the user's hand 604 and identifies the iris 606 of the user's eye 602. The facial region tracker 108 then measures the width of the iris 606 in pixels.

The hand region tracker 110 (FIG. 1) analyzes the orientation of the user's hand 604 and identifies the finger on the hand where the ring will be worn. The hand region tracker 110 then identifies two knuckles 608, 610 (e.g., the base knuckle and the middle knuckle) for purposes of identifying the finger region where a ring is typically worn. As described above, for some embodiments, the computing device 102 measures the width of the finger region located between the two knuckles 608, 610 on the finger by detecting the locations of edges of the finger region located between the two knuckles 608, 610 based on the orientation of the user's hand. The computing device 102 then measures a distance between the edges as the finger region width.

The ring size estimator 112 (FIG. 1) executing in the computing device 102 then estimates the ring size based on the actual iris diameter, the measured iris diameter, and the measured finger region width, where the ring size is estimated according to the following equation:

$$\text{estimated ring size} = \text{actual iris diameter} \times \frac{\text{measured finger region width}}{\text{measured iris diameter}},$$

where the actual iris diameter is 11.7 mm and the estimated ring size is measured in millimeters. As described above, a value of 11.7 mm is used for the actual iris diameter because the average white-to-white horizontal diameter of the eye is approximately 11.7 mm±0.5 mm. The ring size estimator 112 utilizes the 11.7 mm as a reference value when estimating the ring size of the user.

Figure 7:
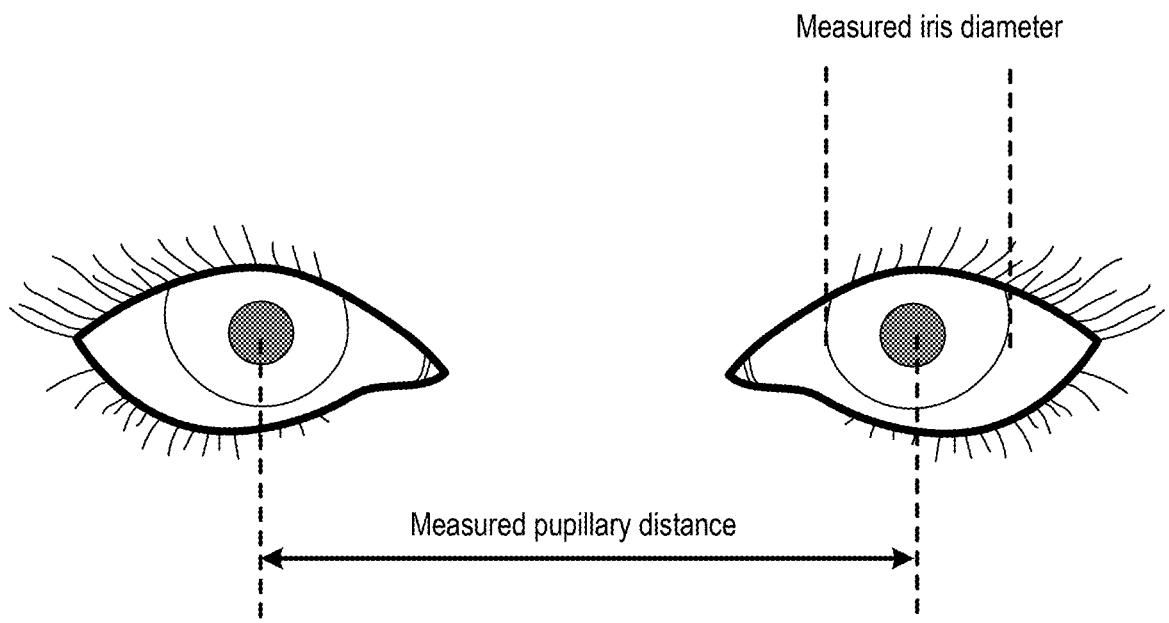
FIG. 7 illustrates the computing device of FIG. 1 estimating the ring size of the user based on the measured iris diameter and the measured pupillary distance of the user according to various embodiments of the present disclosure.

FIG. 7 illustrates the computing device 102 of FIG. 1 estimating the ring size of the user based on the measured iris diameter and the measured pupillary distance of the user. In some instances, the user may know the actual pupillary distance of the user based on, for example, a glasses prescription. The facial region tracker 108 (FIG. 1) measures the distance between the centers of the user's pupils as the measured pupillary distance in pixels. The facial region tracker 108 also measures the iris diameter in pixels. The user specifies the actual pupillary distance, and the computing device 102 estimates the ring size based on the actual pupillary distance, the measured iris diameter, and the measured pupillary distance, where the ring size is estimated according to the following equation:

$$\text{estimated ring size} = \text{actual pupillary distance} \times \frac{\text{measured iris diameter}}{\text{measured pupillary distance}},$$

where the estimated ring size is measured in millimeters.

Figure 8:
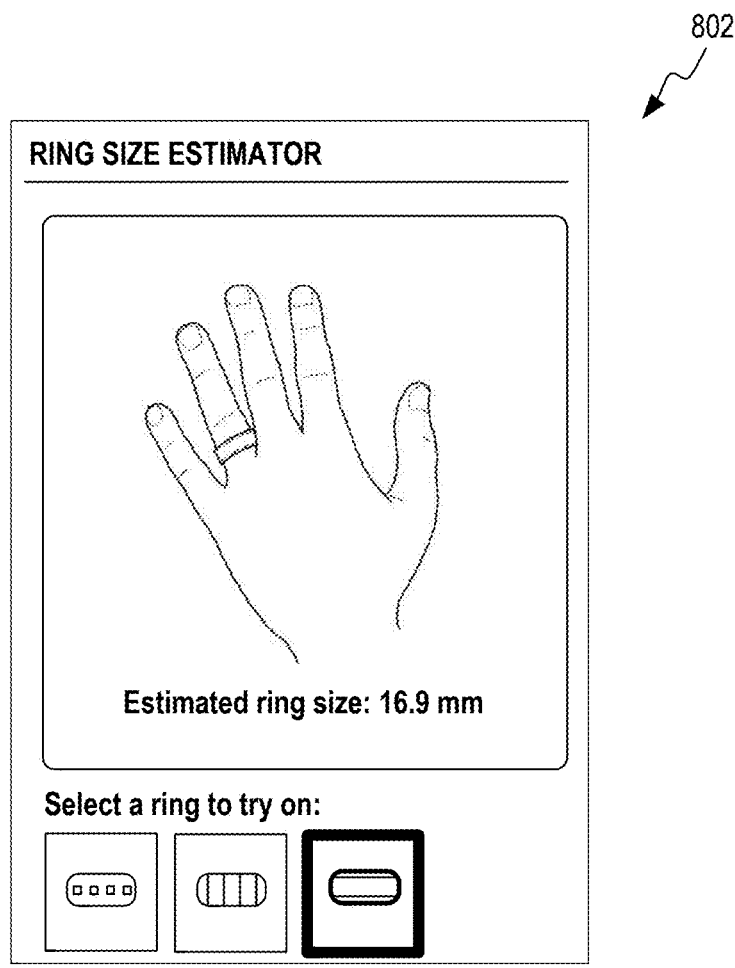
FIG. 8 illustrates an example user interface whereby the estimated ring size is displayed to the user according to various embodiments of the present disclosure.

FIG. 8 illustrates an example user interface 802 provided on a display of the computing device 102 (FIG. 1) whereby the estimated ring size is displayed to the user according to various embodiments of the present disclosure. For some embodiments, the user is able to select a desired ring from a toolbar shown in the user interface 802, and the ring size estimator 112 (FIG. 1) outputs the estimated ring size and performs virtual application of the selected ring on the user's hand.

Figure 9:
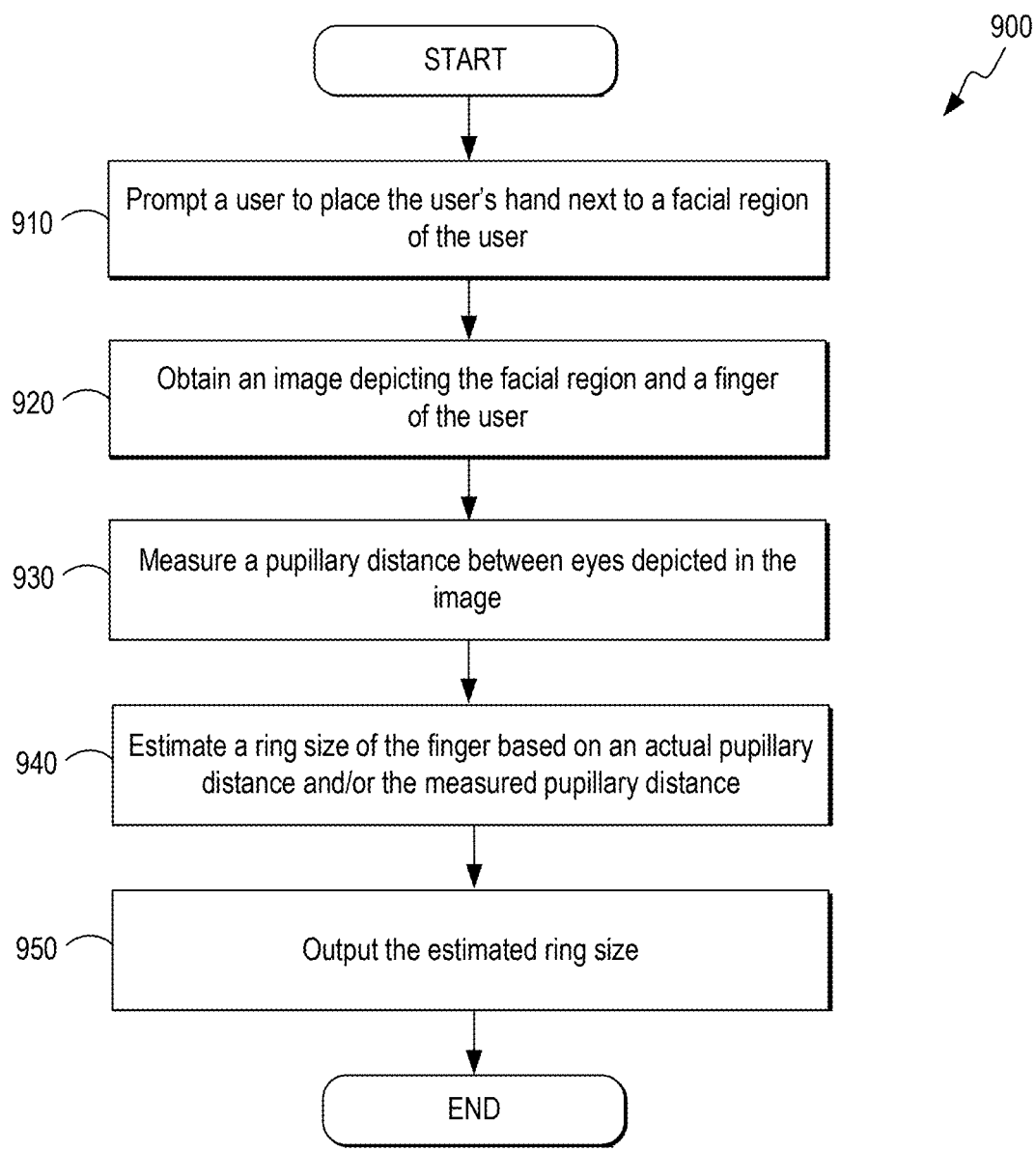
FIG. 9 is a top-level flowchart illustrating examples of functionality implemented as portions of the computing device of FIG. 1 for performing contactless ring size estimation according to an alternative embodiment of the present disclosure.

Reference is made to FIG. 9, which is a flowchart 900 in accordance with an alternative embodiment for performing contactless ring size estimation, where the operations are performed by the computing device 102 of FIG. 1. It is understood that the flowchart 900 of FIG. 9 provides merely an example of the different types of functional arrangements that may be employed to implement the operation of the various components of the computing device 102. As an alternative, the flowchart 900 of FIG. 9 may be viewed as depicting an example of steps of a method implemented in the computing device 102 according to one or more embodiments.

Although the flowchart 900 of FIG. 9 shows a specific order of execution, it is understood that the order of execution may differ from that which is displayed. For example, the order of execution of two or more blocks may be scrambled relative to the order shown. In addition, two or more blocks shown in succession in FIG. 9 may be executed concurrently or with partial concurrence. It is understood that all such variations are within the scope of the present disclosure.

At block 910, the computing device 102 prompts a user to place the user's hand next to a facial region of the user. At block 920, the computing device 102 obtains an image depicting the facial region and a finger of the user. At block 930, the computing device 102 measures a pupillary distance between the user's eyes depicted in the image.

At block 940, the computing device 102 estimates a ring size of the finger based on an actual pupillary distance and/or the measured pupillary distance. For some embodiments, computing device 102 also measures a diameter or radius of the iris of the eye in the facial region. The ring size of the finger is estimated based on the actual pupillary distance, the measured iris diameter, and/or the measured pupillary distance, where the ring size is estimated according to the following equation:

$$\text{estimated ring size} = \text{actual pupillary distance} \times \frac{\text{measured iris diameter}}{\text{measured pupillary distance}},$$

where the actual pupillary distance is specified by the user, and wherein the estimated ring size is measured in millimeters.

At block 950, the computing device 102 outputs the estimated ring size. For some embodiments, the computing device 102 is further configured to perform virtual application of a ring on the finger based on the estimated ring size. Thereafter, the process in FIG. 9 ends.

It should be emphasized that the above-described embodiments of the present disclosure are merely possible examples of implementations set forth for a clear understanding of the principles of the disclosure. Variations and modifications may be made to the above-described embodiment(s) without departing substantially from the spirit and principles of the disclosure. All such modifications and variations are included herein within the scope of this disclosure and protected by the following claims.

At least the following is claimed:

1. A method implemented in a computing device, comprising:
    prompting a user to place the user's hand next to a facial region of the user;
    obtaining an image depicting the facial region and a finger of the user;
    measuring a diameter of an iris in the facial region;
    measuring a width of a finger region located between two knuckles on the finger depicted in the image;
    estimating a ring size of the finger based the actual iris diameter, the measured iris diameter, and the measured finger region width, wherein the ring size is estimated according to the following equation:

$$\text{estimated ring size} = \text{actual iris diameter} \times \frac{\text{measured finger region width}}{\text{measured iris diameter}}.$$

wherein the actual iris diameter is equal to 11.7, and wherein the estimated ring size is measured in millimeters; and
    outputting the estimated ring size.

2. The method of claim 1, further comprising performing virtual application of a ring on the finger based on the estimated ring size.

3. The method of claim 1, wherein the iris diameter and the finger region width are measured in number of pixels.

4. The method of claim 1, wherein prompting the user to place the user's hand next to the facial region of the user comprises prompting the user to place the user's hand next to a facial region of the user with the hand being held such that a palm of the hand faces towards the user.

5. A system, comprising:
    a memory storing instructions;
    a processor coupled to the memory and configured by the instructions to at least:
        prompt a user to place the user's hand next to a facial region of the user;
        obtain an image depicting the facial region and a finger of the user;
        measure a diameter of an iris in the facial region;
        measure a width of a finger region located between two knuckles on the finger depicted in the image;
        estimate a ring size of the finger based on the actual iris diameter, the measured iris diameter, and the measured finger region width, wherein the ring size is estimated according to the following equation:

$$\text{estimated ring size} = \text{actual iris diameter} \times \frac{\text{measured finger region width}}{\text{measured iris diameter}},$$

wherein the actual iris diameter is equal to 11.7, and wherein the estimated ring size is measured in millimeters; and
        output the estimated ring size.

6. The system of claim 5, wherein the processor is further configured to perform virtual application of a ring on the finger based on the estimated ring size.

7. The system of claim 5, wherein the iris diameter and the finger region width are measured in number of pixels.

8. The system of claim 5, wherein the processor is configured to prompt the user to place the user's hand next to the facial region of the user by prompting the user to place the user's hand next to a facial region of the user with the hand being held such that a palm of the hand faces towards the user.

9. A non-transitory computer-readable storage medium storing instructions to be implemented by a computing device having a processor, wherein the instructions, when executed by the processor, cause the computing device to at least:
    prompt a user to place the user's hand next to a facial region of the user;
    obtain an image depicting the facial region and a finger of the user;
    measure a diameter of an iris in the facial region;
    measure a width of a finger region located between two knuckles on the finger depicted in the image;
    estimate a ring size of the finger based on the actual iris diameter, the measured iris diameter, and the measured finger region width, wherein the ring size is estimated according to the following equation:

$$\text{estimated ring size} = \text{actual iris diameter} \times \frac{\text{measured finger region width}}{\text{measured iris diameter}}.$$

wherein the actual iris diameter is equal to 11.7, and wherein the estimated ring size is measured in millimeters; and
    output the estimated ring size.

10. The non-transitory computer-readable storage medium of claim 9, wherein the processor is further configured by the instructions to perform virtual application of a ring on the finger based on the estimated ring size.

11. The non-transitory computer-readable storage medium of claim 9, wherein the iris diameter and the finger region width are measured in number of pixels.

12. The non-transitory computer-readable storage medium of claim 9, wherein the processor is configured by the instructions to prompt the user to place the user's hand next to the facial region of the user by prompting the user to place the user's hand next to a facial region of the user with the hand being held such that a palm of the hand faces towards the user.

\* \* \* \* \*